United States Patent [19]

Post et al.

[11] Patent Number: 4,535,966

[45] Date of Patent: Aug. 20, 1985

[54] THROTTLE VALVE

[75] Inventors: Karl-Heinz Post, Kaarst; Otwin Eich, Remscheid, both of Fed. Rep. of Germany

[73] Assignee: Barmag Barmer Maschinenfabrik Aktiengesellschaft, Remscheid, Fed. Rep. of Germany

[21] Appl. No.: 422,968

[22] Filed: Sep. 24, 1982

[30] Foreign Application Priority Data

Sep. 26, 1981 [DE] Fed. Rep. of Germany ....... 3138345

[51] Int. Cl.[3] .................................... F16K 31/124

[52] U.S. Cl. .................................... 251/31; 251/63; 251/26

[58] Field of Search ........................ 137/625.43, 625.6; 251/31, 282, 26; 91/51, 365, 387

[56] References Cited

U.S. PATENT DOCUMENTS

| | | | |
|---|---|---|---|
| 607,265 | 7/1898 | McLean | 251/31 |
| 3,604,459 | 9/1971 | Rosaen . | |
| 3,684,238 | 8/1972 | Michellone et al. | 251/282 X |
| 4,070,000 | 1/1978 | Prescott | 251/26 |

FOREIGN PATENT DOCUMENTS

| | | |
|---|---|---|
| 831787 | 2/1952 | Fed. Rep. of Germany . |
| 2845922 | 4/1980 | Fed. Rep. of Germany . |
| 2235300 | 6/1973 | France . |
| 1470818 | 6/1973 | United Kingdom . |

OTHER PUBLICATIONS

Oelhydraulik und Pneumatik, 25 (1981) Nr. 1, pp. 34-36.

*Primary Examiner*—Martin P. Schwadron
*Assistant Examiner*—John S. Starsiak, Jr.
*Attorney, Agent, or Firm*—Bell, Seltzer, Park & Gibson

[57] ABSTRACT

A hydraulic throttle valve is disclosed which includes a choke piston slideably mounted in a bore for movement between an open position and a closed position. A differential piston is coaxially mounted with respect to the choke piston, and a control valve is mounted for slideable movement in a second bore which is laterally spaced from and parallel to the first bore. The control valve is operated by an electromagnet to selectively direct a control fluid to either side of the differential piston, and thereby open or close the choke piston. A feedback spring arm interconnects the choke piston and the control valve, with the spring arm resisting the opening of the choke valve and with the resisting force being a function of the force applied to the control valve by the electromagnet. A balance of forces acting on the choke piston is thereby achieved, with the choke piston being opened to an extend functionally related to the magnitude of the input current to the electromagnet. A shuttle valve is also provided which is operatively connected to each of the hydraulic inlet channel and the hydraulic outlet channel of the throttle valve, with the output of the shuttle valve being operatively connected to the control valve. The shuttle valve acts to connect that one of the inlet and outlet channels having the higher pressure, to the control valve.

35 Claims, 3 Drawing Figures

THROTTLE VALVE

Figure 1:
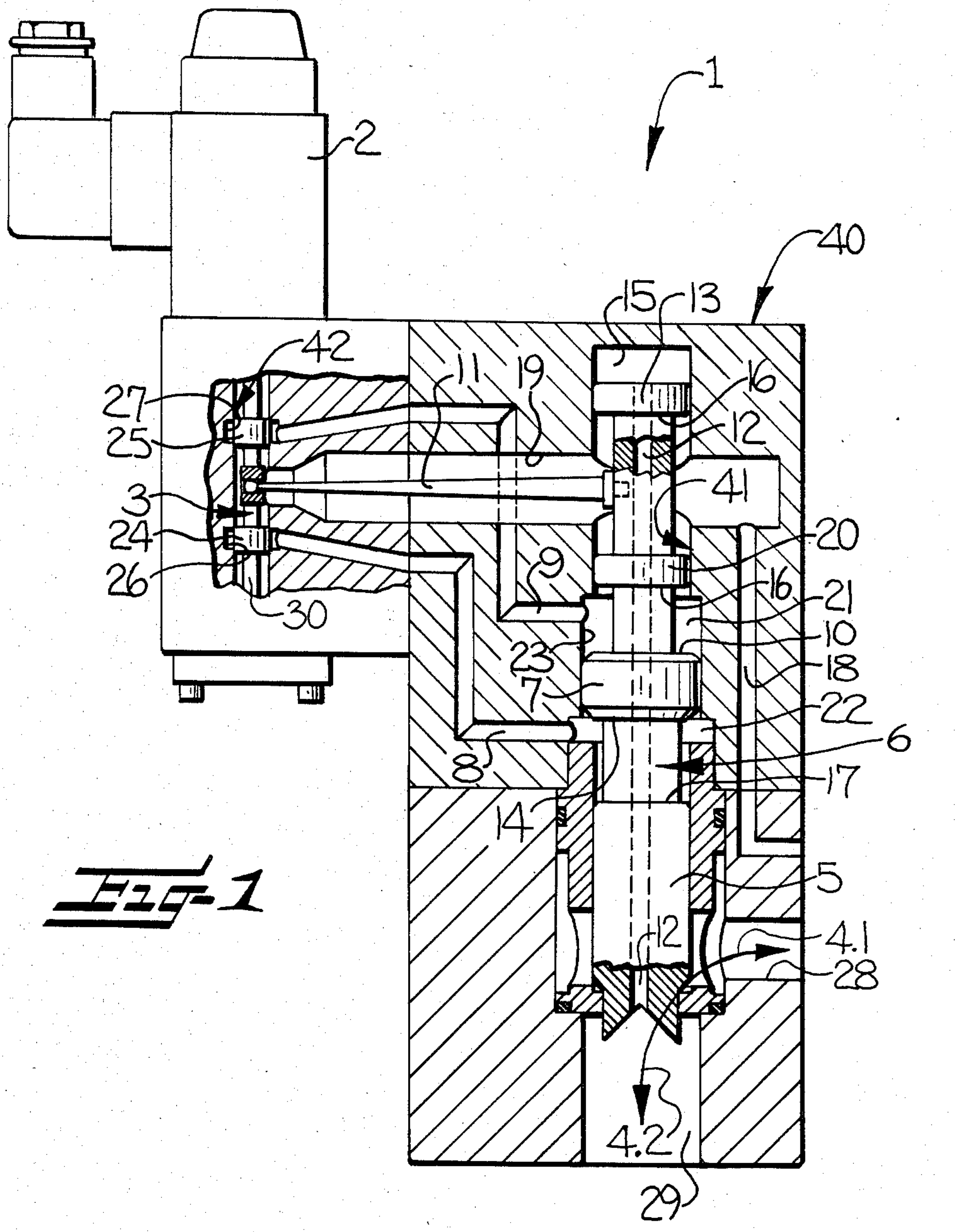

The present invention relates to a hydraulic throttle valve which is characterized by the output flow rate being functionally related to the magnitude of an input signal.

A proportional two-way hydraulic throttle valve is known which receives a control pressure on the side opposite the pump pressure and which is actuated by a locking spring in the closing direction. The control pressure is controlled by a control valve which is operative in dependence upon an electromagnetically supplied reference input, and a coil spring extending between a choke piston and the control valve feeds back the instantaneous choke piston position to the control valve (Oelhydraulik and Pneumatik 1981, page 35). Due to the relatively small force of the closing spring, the throttle valve operates too sluggishly in the closing direction, particularly when there is no pressure difference between inflowing and outflowing fluid. There is also a problem in that the control valve magnet receives the full pressure of the pump.

It is an object of the present invention to provide an improved hydraulic throttle valve of the described type, and which overcomes the above-noted problems associated with the known valve.

In achieving the above object of the present invention, there is provided a hydraulic throttle valve which includes a choke piston slideably mounted in a bore for movement between a closed position and an open position, and control means for selectively biasing the choke piston toward one of either its closed or open position. The control means includes a control valve which is slideably mounted for movement between a closed position wherein the choke piston is biased toward its closed position, and an open position wherein the choke position is biased toward its open position. The movement of the control valve is controlled by an electromagnetic actuating means which is responsive to a variable input signal for moving the control valve toward its open position with a variable force, which is functionally related to the input signal. The choke position and the control valve are operatively interconnected by a feedback spring arm, and such that movement of either the choke piston or control valve from its closed position toward its open position acts to bias the other member toward its closed position. Thus when an input signal is given to the actuating means to cause the control valve to move toward its open position, the control means acts to bias the choke piston toward its open position, and the feedback spring arm acts to bias the choke piston towards its closed position. The opposing forces will become balanced and the choke piston will be opened to an extent which is functionally related to the magnitude of the input signal.

In the preferred embodiment of the invention, the control means includes a differential piston which is coaxially mounted with respect to the choke piston. The larger effective surface of the differential piston is operative in the closing direction of the choke piston, and the opposite sides of the differential piston each receive a pressurized control fluid, which is supplied through separate ducts from the control valve.

In accordance with the present invention, the control means further includes a shuttle valve which is operatively connected to each of the inlet channel and the outlet channel of the throttle valve. The outlet of the shuttle valve is connected to the bore which mounts the control valve, and such that the hydraulic fluid controlled by the throttle valve serves as the pressurized control fluid which is supplied to the control valve and the two sides of the differential piston. The shuttle valve is responsive to the pressures in the inlet and outlet channels, and acts to operatively connect the one of the channels having the higher pressure to the control valve.

Also in the preferred embodiment, the choke piston and control valve are adapted to be moved along parallel, laterally spaced apart axes, and the spring arm extends laterally therebetween, with one end thereof secured to the choke piston, and the other end secured to the control valve. The spring arm is seen to eliminate a disadvantage of the coil spring of the above described prior valve, i.e. fatigue.

As will be apparent, the present invention provides that the actuation of the choke piston in both directions is solely dependent on the control means. Thus, the throttle valve is able to close securely even when there is no significant pressure difference present in the fluid conveying system.

Figure 2:
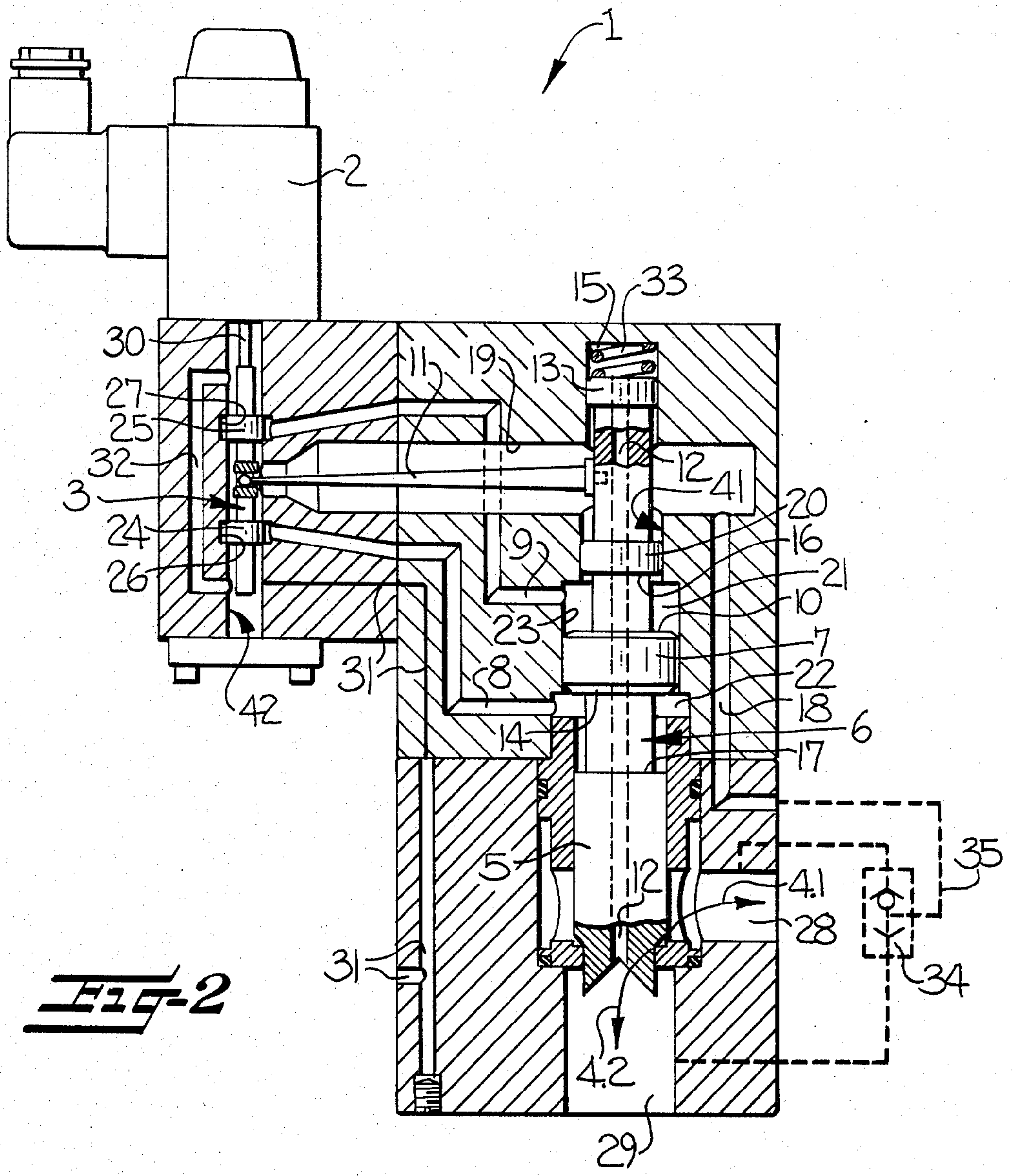
Figure 3:
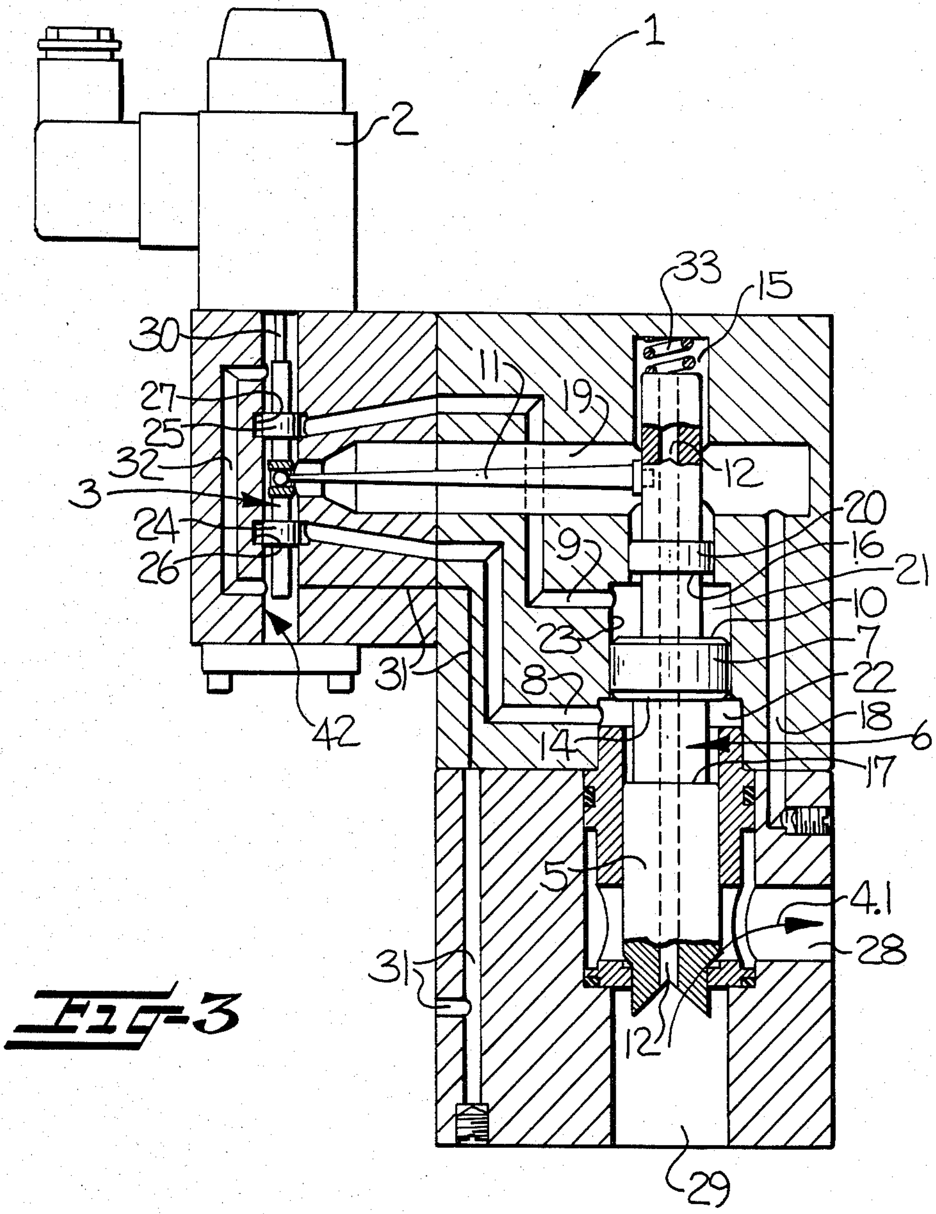

Some of the objects and advantages of the present invention having been stated, other advantages will appear as the description proceeds, when taken in conjunction with the accompanying drawings, in which FIG. 1 is a sectional side elevation view of a hydraulic throttle valve embodying the features of the present invention; and FIGS. 2 and 3 are views similar to FIG. 1, and illustrating other embodiments and features of the invention.

Referring more particularly to the drawings, FIG. 1 illustrates a hydraulic flow control valve 1 which includes a housing 40 consisting of several parts. The housing has a bore 41 therein, and which is composed of a number of coaxial segments of different diameters. A hydraulic channel 29 and a hydraulic channel 28 each communicate with the bore, which permits fluid flow in the direction 4.1 or 4.2, thus serving alternately as an inlet and an outlet.

A piston rod 6 is slideably disposed in the bore 41, and the rod mounts a choke piston 5 at the end of the rod adjacent the inlet and outlet channels. As hereinafter further described, the rod 6 and choke piston 5 are moveable between a closed position (as shown in FIG. 1) wherein flow between the inlet and outlet channels is closed, and a raised open position wherein communication between the inlet and outlet channels is open.

The piston rod 6 also mounts a differential piston 7 disposed in spaced relation above the choke piston, and a blocking piston 20 disposed in spaced relation above the differential piston 7. The differential piston 7 slides in the portion 23 of the bore, and defines a closing side surface 10 facing away from the choke piston, and an opening side surface 14 facing toward the choke piston. In addition, a closing side chamber 21 is defined between the surface 10 of the differential piston and the surface 16 of the blocking piston 20, and an opening side chamber 22 is defined between the surface 14 of the differential piston and the surface 17 of the choke piston. The inner or upper end of the piston rod 6 mounts a pressure relief piston 13 in the inner end of the bore to define a chamber 15, and a pressure relief duct 12 extends axially through the piston rod to thereby establish an equilibrium of the fluid pressure forces acting on the ends of the rods, and as further described below.

The surface ratios of the two sides of the differential piston 7 are of significance to the operation of the disclosed valve. In particular, in the chamber 21, the piston surface 10, reduced by the piston surface 16, defines an effective surface area which acts to bias the differential piston toward its closed position. In the chamber 22, the piston surface 14, reduced by the piston surface 17, defines an effective surface area which acts to bias the differential piston towards the open position. In the embodiment of FIG. 1, the diameter of the choke piston 5 and the blocking piston 20 are about the same, and thus the effective surface areas on the opposite sides of the differential piston 7 are the same. However, in the embodiments of FIGS. 2 and 3, the diameter of the blocking piston 20 is less than the diameter of the choke piston 5, and thus the effective surface area in the chamber 21 which acts to move the piston 7 downwardly toward its closed position is larger than the effective surface area in the chamber 22 acting to move the piston 7 upwardly toward the open position.

A control system is provided for biasing the choke piston toward one of either its closed or open positions, and includes a control valve 3 which is slideably mounted for movement in a second bore 42 which defines an axis which is parallel to the axis of the bore 41 and piston rod 6. The control valve 3 includes a rod 30 mounting a pair of spaced apart collars 24, 25, with a bearing positioned intermediate the collars. The bore 42 receiving the valve 3 includes a pair of annular ducts 26, 27 which are adapted to be covered and substantially closed by the collars 24, 25 respectively when the valve 3 is in its closed or neutral position as illustrated. The position of the valve 3 is controlled by the electromagnet 2, which is responsive to a variable electric input signal for biasing the valve 3 downwardly as shown in the drawings to its open position, with a force which is functionally related to the magnitude of the input signal.

The annular duct 26 communicates with a passage 8 leading to the chamber 22 of the bore 41 below the differential piston, and the annular duct 27 communicates with a passage 9 leading to the chamber 21 above the differential piston. A connecting duct 19 extends laterally through the interior of the housing so as to communicate with the bore 41 of the piston rod 6 and the bore 42 of the control valve 3 at a point intermediate the annular ducts 26 and 27. In addition, a control fluid duct 18 communicates with the connecting duct 19.

Feedback means, in the form of a spring arm 11, operatively interconnects the choke piston and the control valve. The arm 11 extends through the connecting duct 19, with one end being pivotally secured at the bearing of the valve 3, and the other end being fixedly secured to the piston rod 6. The spring arm 11 serves to interconnect the choke piston and control valve in such a way that upon movement of one of these components, the spring arm will impart a biasing force to the other component tending to move it in the same direction. Thus for example, upon downward movement of the control valve 3 from its closed or neutral position toward its open position, the piston rod 6 will be biased downwardly toward its closed position.

To now describe the operation of the valve 1, it will initially be assumed that the electromagnet 2 is positioned so that the control valve 3 is in its closed or neutral position, as illustrated in the drawings. In such position, the collars 24, 25 cover the ducts 26, 27 respectively, and a control fluid pressure is fed to the control valve 3 via the duct 18 and connection duct 19. In the embodiments of FIGS. 2 and 3, the collars 24, 25 do not totally close the passages 8 and 9 however, and a narrow slot (which cannot be seen in the drawings), permits the control fluid to be fed through the passages 8 and 9 to the chambers 21 and 22. Due to the differing effective surface areas on the opposite sides of the differential piston 7, the piston rod 6 will thus be biased downwardly to its closed position.

Upon energizing the electromagnet 2 to move the control valve 3 downwardly, the annular duct 26 and duct 8 are opened to the control fluid, and the annular duct 27 is opened to a tank (not shown). The resulting pressure in the chamber 22 causes the piston rod to move upwardly, and thus open communication between the inlet and outlet channels 28, 29 of the valve.

The current input to the electromagnet 2 is variable. A high current will move the control valve 3 downwardly a substantially distance against the force of the spring arm 11, which is bent downwardly by this movement. Also, the annular duct 26 will then be fully opened causing the hydraulic control fluid to move through the duct 8 and raise the choke piston 5. A lower current input will exert a lower force on the control valve 3, to only partially open the annular duct 26.

The opening of the annular duct 26 results in the upward movement of the choke piston. This upward movement causes the spring arm 11 to be bent even more, and to exert a stronger spring force on the control valve 3. Thus the feedback force provided by the spring arm 11 acts to return the control valve 3 toward its closed or neutral position, and to resist upward movement of the choke piston. A balance of forces is thereby achieved between the force of the fluid pressure in the chamber 22 which tends to open the choke valve, and the biasing force of the spring arm 11 which tends to close the choke valve, and with the choke piston being held open to an extent which is functionally related to the magnitude of the input current. Thus, the hydraulic flow rate through the choke valve is functionally related to the magnitude of the input current. Since the input current is adjustable, the valve of the present invention may be readily used to control the speed of operation of a separate piece of machinery, such as a hydraulic hoisting crane, with the speed depending upon the input current and the resulting position of the choke piston of the valve.

Closing of the choke piston is effected by releasing the input current to the electromagnet. Thereby the magnet forces acting on the rod 30 of control valve 3 are released and the spring force of spring arm 11 will be able to move rod 30 to a position wherein collar 25 opens the annular duct from connection duct 19 to passage 9 thereby supplying pressurized oil to chamber 21 and to piston surface 10.

It will also be noted that the choke piston 5, the blocking piston 20, and the pressure relief piston 13 are all fixed to the piston rod 6 and in the embodiment of FIG. 1 all of these pistons have about the same diameters. In addition, the connecting duct 19 intersects the bore 41 at a point intermediate the pistons 20 and 13. Also, the effective surface area of the piston 13 is equal to the effective surface area of the choke piston 5. Thus the communication through the duct 12 acts to equalize the hydraulic forces acting on the rod in the axial direction.

The valve as shown in FIG. 1 also has the advantage that it is hydraulically controlled, but independently of the conveying fluid, its flow direction and its pressure.

Thus a reliable opening and closing at high speeds may be achieved.

The embodiment of the invention illustrated in FIG. 2 generally corresponds to the above described embodiment of FIG. 1, but FIG. 2 illustrates several additional features. In particular, FIG. 2 includes a duct 31 which connects the control valve bore 42 to an external tank (not shown), and which further includes a bridge duct 32 for connecting the opposite ends of the bore 42 to the duct 31. The ducts 31 and 32 result in the control valve 3 acting as a so-called hydraulic bridge by means of which different control pressures in ducts 8 and 9 may be generated for operating the differential piston 7.

The embodiment of FIG. 2 also utilizes a helical spring 33 disposed at the end of the bore 41, and which applies a force to the end of the piston rod 6 in a direction tending to close the choke piston 5. In this regard, it is often desirable to maintain a low pressure on the side 21 of the differential piston in order to keep the choke piston closed. To achieve this, the electromagnet 2 and control valve 3 may be adjusted in such a way so as to slightly lift the control valve 3 in its closed position, to thereby provide a narrow slot between the collar 25 and duct 27 through which some fluid is fed from the duct 19 to side 21 of the differential piston. This results in the spring arm 11 exerting a small upward force on the piston rod 6, which is resisted by the helical spring 33 to prevent the opening of the choke piston.

FIG. 2 also illustrates a shuttle valve 34 for selectively connecting the control fluid duct 18 to either one of the inlet channel 28 or outlet channel 29. More particularly, one input opening of the shuttle valve is connected to the channel 28, and the other input opening is connected to the channel 29. The output opening 35 is connected to the control fluid duct 18. The shuttle valve 34 hydraulically operates as schematically illustrated in FIG. 2 such that the control fluid duct 18 is always connected to that one of the channels 28 or 29 which has the higher pressure. If the pressure is the same, the duct 18 is connected to both channels 28 and 29. If the flow direction, as indicated by the arrows 4.1 and 4.2, is changed, the control pressure is automatically provided by the channel 28 or 29 which is the feed or inlet duct. The system also operates where one of the channels 28 or 29 has no pressure, such as where it is connected to the tank.

The embodiment of FIG. 3 generally corresponds to the embodiments of FIGS. 1 and 2, but in FIG. 3 the pressure relief piston 13 at the inner end of the piston rod is omitted. By this construction, the connecting duct 19 is permanently connected via the axial duct 12 to the inlet channel 29. Thus only flow in the direction of arrow 4.1 is possible. Also, the valve of FIG. 3 operates independently of the pressure difference between the channels 28 and 29, and the closing force as well as the closing speed of the choke piston depend only on the ratio of the surface areas of the differential piston 7. The closing force of the choke piston 5 may be further increased by adjusting the electromagnet 2 and control valve 3 in the manner described above, and in such a way that the side 21 of the differential piston 7 is biased downwardly by a slight pressure in the inoperative position of the control valve 3. The resulting force of the spring arm 11 acting on the piston rod 6 is compensated by the spring 33 in the manner described above.

In the drawings and specification, there has been set forth a preferred embodiment of the invention, and although specific terms are employed, they are used in a generic and descriptive sense only and not for purposes of limitation. For example, it will be understood that pressure relief duct 12, which is shown to extend through the piston rod, may alternatively extend parallel thereto through the housing from flow channel 29 to inner end portion 15 of the bore defined by pressure relief piston 13 as shown in FIG. 1 and FIG. 2 or defined by blocking piston 20 as shown in FIG. 3.

That which is claimed is:

1. A hydraulic throttle valve comprising a housing having a bore therein, with said bore having a closed inner end, a hydraulic inlet channel and a hydraulic outlet channel, each communicating with said bore in said housing, and with one of said inlet and outlet channels including a valve seat which is coaxially aligned with said bore, a piston rod mounting a choke piston adjacent one end thereof, said piston rod and choke piston being slideably mounted in said bore for movement between a closed position wherein said choke piston operatively engages said valve seat to close communication between said inlet and outlet channels, and an open position wherein said choke piston is axially withdrawn from said valve seat to permit such communication, a differential piston mounted to said piston rod at a location axially spaced from said choke piston in a direction toward said closed inner end of said bore, and a blocking piston mounted to said piston rod at a location axially spaced from said differential piston in a direction toward said closed inner end of said bore, and such that a first chamber is defined within said bore between said choke piston and said differential piston and a second chamber is defined within said bore between said differential piston and said blocking piston, with the diameter of said differential piston being different from the diameter of said choke piston and different from the diameter of said blocking piston, such that a pressure within said first chamber acts to bias the choke piston toward one of either said open or closed positions and a pressure within said second chamber acts to bias the choke piston toward the other position, control means for selectively biasing said choke piston toward one of either its closed or open positions, and including entry duct means for delivering a pressurized control fluid, first outlet duct means leading from said entry duct means to said first chamber, second outlet duct means leading from said entry duct means to said second chamber, and control valve means for providing selective communication between said entry duct means and either one of said first and second outlet duct means, whereby actuation of said control valve means results in the biasing of said choke piston toward either its open or its closed position, and valve means operatively connected to each of said inlet channel and said outlet channel for operatively connecting at least one of said channels to said entry duct means of said control means, whereby the hydraulic fluid which flows through said channels serves as the pressurized control fluid of said control means.

2. The hydraulic throttle valve as defined in claim 1 wherein said valve means includes a pressure responsive shuttle valve for connecting the one of said inlet channel and outlet channel having the higher pressure to said entry duct means of said control means.

3. The hydraulic throttle valve as defined in claim 2 further comprising a pressure relief duct extending between said one of said inlet and outlet channels and said closed inner end of said bore.

4. The hydraulic throttle valve as defined in claim 3 further comprising a pressure relief piston mounted to the end of said piston rod immediately adjacent said closed inner end of said bore so as to define a pressure relief chamber at said closed inner end of said bore which communicates with said pressure relief duct, and wherein said entry duct means includes a connecting duct which intersects said bore intermediate said blocking piston and said pressure relief piston for delivering a pressurized control fluid to said control valve means.

5. The hydraulic throttle valve as defined in claim 3 wherein said choke piston and said blocking piston have about the same diameter.

6. The hydraulic throttle valve as defined in claim 4 wherein said choke piston, said blocking piston, and said pressure relief piston all have about the same diameter.

7. The hydraulic throttle valve as defined in claim 3 wherein said control valve is slideably mounted in a second bore which is parallel to the first mentioned bore for movement between a closed position wherein said first and second outlet duct means are at least substantially closed, a first open position on one side of said closed position wherein said first outlet duct means is open to the control fluid entering from said entry duct means, and a second open position on the other side of said closed position wherein said second outlet duct means is open to the control fluid entering from said entry duct means.

8. The hydraulic throttle valve as defined in claim 7 wherein said control means further comprises feedback means operatively interconnecting said choke piston and said control valve such that movement of said control valve from its closed position toward its first open position acts to bias said choke piston toward its closed position, and movement of said choke piston from its closed position toward its open position acts to bias said control valve toward its second open position.

9. The hydraulic throttle valve as defined in claim 3 further comprising a spring disposed between said closed inner end of said bore and the adjacent end of said piston rod for applying a biasing force toward the closed position of said choke piston.

10. A hydraulic throttle valve which is characterized by the output flow rate being functionally related to the magnitude of an input signal, and comprising a housing having first and second parallel and laterally spaced apart bores therein, with said first bore having a closed inner end, a hydraulic inlet channel and a hydraulic outlet channel, each communicating with said first bore in said housing, with one of said inlet and outlet channels including a valve seat which is coaxially aligned with said first bore, a piston rod mounting a choke piston adjacent one end thereof, said piston rod and choke piston being slideably mounted in said first bore for movement between a closed position wherein said choke piston operatively engages said valve seat to close communication between said inlet and outlet channels, and an open position wherein said choke piston is axially withdrawn from said valve seat to permit such communication, a differential piston mounted to said piston rod at a location axially spaced from said choke piston in a direction toward said closed inner end of said first bore, and a blocking piston mounted to said piston rod at a location axially spaced from said differential piston in a direction toward said closed inner end of said first bore, and such that a first chamber is defined within said first bore between said choke piston and said differential piston and a second chamber is defined within said first bore between said differential piston and said blocking piston, with the diameter of said differential piston being greater than the diameter of each of said choke piston and said blocking piston, such that a pressure within said first chamber acts to bias the choke piston toward its open position and a pressure within said second chamber acts to bias the choke piston toward its closed position, control means for selectively biasing said choke piston toward one of either its closed or open positions, and including (a) entry duct means for delivering a pressurized control fluid to said second bore, (b) a first outlet duct leading from said second bore to said first chamber, (c) a second outlet duct leading from said second bore to said second chamber, (d) a control valve slideably mounted in said second bore for movement between a closed position wherein said first and second outlet ducts are at least substantially closed, and an open position wherein said first outlet duct is opened to the control fluid entering from said entry duct means and said second outlet duct is closed to such fluid, and (e) actuating means responsive to a variable input signal for biasing the control valve toward its open position with a variable force which is functionally related to the output signal, pressure responsive shuttle valve means for connecting the one of said inlet channel and outlet channel having the higher pressure to said entry duct means of said control means, such that the hydraulic fluid which flows through said channels serves as the pressurized control fluid of said control means, and feedback means operatively interconnecting said choke piston and said control valve and such that movement of either the choke piston or control valve from its closed position toward its open position acts to bias the other member toward it closed position, whereby movement of the control valve toward its open position by said actuating means results in the control means biasing the choke piston toward its open position, and the feedback means biasing the choke piston toward its closed position, and such that the opposing forces will become balanced and the choke piston will be opened to an extent functionally related to the magnitude of the input signal.

11. The hydraulic throttle valve as defined in claim 10 wherein the difference between the diameter of the differential piston and the diameter of the choke piston is less than the difference between the diameter of the differential piston and the diameter of the blocking piston, and wherein said control valve includes collar means adapted to cover each of said first and second outlet ducts in its closed position while permitting limited flow of the control fluid therethrough, and such that in the closed position of the control valve the differential piston and thus the choke piston are biased toward the closed position thereof.

12. The hydraulic throttle valve as defined in claim 10 wherein said entry duct means of said control means includes a connecting duct extending laterally between said first and second bores, and wherein said feedback means includes a spring arm disposed within said connecting duct and which is secured at one end to said control valve and secured at the other end to said piston rod.

13. The hydraulic throttle valve as defined in claim 12 further comprising bridge duct means connecting the two ends of said second bore and leading to an external opening on the throttle valve.

14. The hydraulic throttle valve as defined in claim 12 further comprising a spring disposed between said closed inner end of said first bore and the adjacent end of said piston rod for applying a biasing force to said piston rod in a direction toward the closed position of said choke piston.

15. The hydraulic throttle valve as defined in claim 12 wherein said piston rod includes a pressure relief passage extending axially through its entire length.

16. The hydraulic throttle valve as defined in claim 15 further comprising a pressure relief piston mounted to the end of said piston rod immediately adjacent said closed inner end of said bore as to define a pressure relief chamber which communicates with said pressure relief passage.

17. The hydraulic throttle valve as defined in claim 16 wherein said connecting duct intersects said first bore intermediate said blocking piston and said pressure relief piston, and wherein said choke piston, said blocking piston, and said pressure relief piston all have about the same diameter.

18. A hydraulic throttle valve comprising a housing having a bore therein, with said bore having a closed inner end, a hydraulic inlet channel and a hydraulic outlet channel, each communicating with said bore in said housing, and with one of said inlet and outlet channels including a valve seat which is coaxially aligned with said bore, a piston rod mounting a choke piston adjacent one end thereof, said piston rod and choke piston being slideably mounted in said bore for movement between a closed position wherein said choke piston operatively engages said valve seat to close communication between said inlet and outlet channels, and an open position wherein said choke piston is axially withdrawn from said valve seat to permit such communication, a differential piston mounted to said piston rod at a location axially spaced from said choke piston in a direction toward said closed inner end of said bore, and a blocking piston mounted to said piston rod at a location axially spaced from said differential piston in a direction toward said closed inner end of said bore, and such that a first chamber is defined within said bore between said choke piston and said differential piston and a second chamber is defined within said bore between said differential piston and said blocking piston, with the diameter of said differential piston being different from the diameter of said choke piston and different from the diameter of said blocking piston, such that a pressure within said first chamber acts to bias the choke piston toward one of either said open or closed positions and a pressure within said second chamber acts to bias the choke piston toward the other position, control means for selectively biasing said choke piston toward one of either its closed or open positions, and including entry duct means for delivering a pressurized control fluid, first outlet duct means leading from said entry duct means to said first chamber, second outlet duct means leading from said entry duct means to said second chamber, and control valve means for providing selective communication between said entry duct means and either one of said first and second outlet duct means, whereby actuation of said control valve means results in the biasing of said choke piston toward either its open or its closed position.

19. The hydraulic throttle valve as defined in claim 18 further comprising a pressure relief duct extending between said one of said inlet and outlet channels and said closed inner end of said bore.

20. The hydraulic throttle valve as defined in claim 19 further comprising a pressure relief piston mounted to the end of said piston rod immediately adjacent said closed inner end of said bore so as to define a pressure relief chamber at said closed inner end of said bore which communicates with said pressure relief duct, and wherein said entry duct means includes a connecting duct which intersects said bore intermediate said blocking piston and said pressure relief piston for delivering a pressurized control fluid to said control valve means.

21. The hydraulic throttle valve as defined in claim 19 wherein said pressure relief duct comprises a passage extending axially through the entire length of said piston rod, and wherein said entry duct means includes a connecting duct which intersects said bore and communicates with said closed inner end thereof, whereby the hydraulic fluid at said one of said inlet and outlet channels is adapted to flow through said piston rod and said connecting duct to said control valve means and thereby serve as the control fluid.

22. The hydraulic throttle valve as defined in claim 19 wherein said choke piston and said blocking piston have about the same diameter.

23. The hydraulic throttle valve as defined in claim 20 wherein said choke piston, said blocking piston, and said pressure relief piston all have about the same diameter.

24. The hydraulic throttle valve as defined in claim 19 wherein said control valve is slideably mounted in a second bore which is parallel to the first mentioned bore for movement between a closed position wherein said first and second outlet duct means are at least substantially closed, a first open position on one side of said closed position wherein said first outlet duct means is open to the control fluid entering from said entry duct means, and a second open position on the other side of said closed position wherein said second outlet duct means is open to the control fluid entering from said entry duct means.

25. The hydraulic throttle valve as defined in claim 24 wherein said control means further comprises feedback means operatively interconnecting said choke piston and said control valve such that movement of said control valve from its closed position toward its first open position acts to bias said choke piston toward its closed position, and movement of said choke piston from its closed position toward its open position acts to bias said control valve toward its second open position.

26. The hydraulic throttle valve as defined in claim 19 further comprising a spring disposed between said closed inner end of said bore and the adjacent end of said piston rod for applying a biasing force toward the closed position of said choke piston.

27. A hydraulic throttle valve which is characterized by the output flow rate being functionally related to the magnitude of an input signal, and comprising a housing having first and second parallel and laterally spaced apart bores therein, with said first bore having a closed inner end, a hydraulic inlet channel and a hydraulic outlet channel, each communicating with said first bore in said housing, with one of said inlet and outlet channels including a valve seat which is coaxially aligned with said first bore, a piston rod mounting a choke piston adjacent one end thereof, said piston rod and choke piston being slideably mounted in said first bore for movement between a closed position wherein said choke piston operatively engages said valve seat to close communication between said inlet and outlet channels, and an open position wherein said choke piston is axially withdrawn from said valve seat to permit such communication, a differential piston mounted to said piston rod at a location axially spaced from said choke piston in a direction toward said closed inner end of said first bore, and a blocking piston mounted to said piston rod at a location axially spaced from said differential piston in a direction toward said closed inner end of said first bore, and such that a first chamber is defined within said first bore between said choke piston and said differential piston and a second chamber is defined within said first bore between said differential piston and said blocking piston, with the diameter of said differential piston being greater than the diameter of each of said choke piston and said blocking piston, such that a pressure within said first chamber acts to bias the choke piston toward its open position and a pressure within said second chamber acts to bias the choke piston toward its closed position, control means for selectively biasing said choke piston toward one of either its closed or open positions, and including (a) entry duct means for delivering a pressurized control fluid to said second bore, (b) a first outlet duct leading from said second bore to said first chamber, (c) a second outlet duct leading from said second bore to said second chamber, (d) a control valve slideably mounted in said second bore for movement between a closed position wherein said first and second outlet ducts are at least substantially closed, and an open position wherein said first outlet duct is opened to the control fluid entering from said entry duct means and said second outlet duct is closed to such fluid, and (e) actuating means responsive to a variable input signal for biasing the control valve toward its open position with a variable force which is functionally related to the output signal, and feedback means operatively interconnecting said choke piston and said control valve and such that movement of either the choke piston or control valve from its closed position toward its open position acts to bias the other member toward its closed position, whereby movement of the control valve toward its open position by said actuating means results in the control means biasing the choke piston toward its open position, and the feedback means biasing the choke piston toward its closed position, and such that the opposing forces will become balanced and the choke piston will be opened to an extent functionally related to the magnitude of the input signal.

28. The hydraulic throttle valve as defined in claim 27 wherein the difference between the diameter of the differential piston and the diameter of the choke piston is less than the difference between the diameter of the differential piston and the diameter of the blocking piston, and wherein said control valve includes collar means adapted to cover each of said first and second outlet ducts in its closed position while permitting limited flow of the control fluid therethrough, and such that in the closed position of the control valve the differential piston and thus the choke piston are biased toward the closed position thereof.

29. The hydraulic throttle valve as defined in claim 27 wherein said entry duct means of said control means includes a connecting duct extending laterally between said first and second bores, and wherein said feedback means includes a spring arm disposed within said connecting duct and which is secured at one end to said control valve and secured at the other end to said piston rod.

30. The hydraulic throttle valve as defined in claim 29 further comprising bridge duct means connecting the two ends of said second bore and leading to an external opening on the throttle valve.

31. The hydraulic throttle valve as defined in claim 29 further comprising a spring disposed between said closed inner end of said first bore and the adjacent end of said piston rod for applying a biasing force to said piston rod in a direction toward the closed position of said choke piston.

32. The hydraulic throttle valve as defined in claim 29 wherein said piston rod includes a pressure relief passage extending axially through its entire length.

33. The hydraulic throttle valve as defined in claim 32 wherein said inlet channel includes said valve seat and is coaxially aligned with said first bore, and wherein the portion of said first bore adjacent said closed inner end is in communication with said connecting duct, whereby the hydraulic fluid at said inlet channel flows through said piston rod and to said connecting duct and serves as the pressurized control fluid.

34. The hydraulic throttle valve as defined in claim 32 further comprising a pressure relief piston mounted to the end of said piston rod immediately adjacent said closed inner end of said bore as to define a pressure relief chamber which communicates with said pressure relief passage.

35. The hydraulic throttle valve as defined in claim 34 wherein said connecting duct intersects said first bore intermediate said blocking piston and said pressure relief piston, and wherein said choke piston, said blocking piston, and said pressure relief piston all have about the same diameter.

* * * * *